United States Patent [19]

Horst et al.

[11] Patent Number: 4,941,205
[45] Date of Patent: Jul. 10, 1990

[54] BIDIRECTIONAL OPTICAL DATA COMMUNICATIONS SYSTEM

[75] Inventors: William R. Horst; William J. Hale, both of Dayton, Ohio

[73] Assignee: NCR Corporation, Dayton, Ohio

[21] Appl. No.: 217,509

[22] Filed: Jul. 11, 1988

Related U.S. Application Data

[63] Continuation of Ser. No. 618,001, Jul. 6, 1984, abandoned.

[51] Int. Cl.$^5$ .............................................. H04B 10/10
[52] U.S. Cl. ..................................... 455/605; 455/606
[58] Field of Search ............... 455/605, 606, 607, 617; 370/3

[56] References Cited

U.S. PATENT DOCUMENTS

| | | | |
|---|---|---|---|
| 3,377,616 | 4/1968 | Auer, Jr. ............................. | 455/608 |
| 3,433,960 | 3/1969 | Minott ................................. | 455/605 |
| 3,630,015 | 12/1971 | Lehovec ............................. | 350/330 |
| 3,675,989 | 7/1972 | Pietsch et al. ..................... | 455/605 |
| 3,705,986 | 12/1972 | Sanders et al. .................... | 455/608 |
| 4,063,083 | 12/1977 | Cathey et al. ..................... | 455/607 |
| 4,096,380 | 6/1978 | Eichweber ......................... | 455/605 |
| 4,114,151 | 9/1978 | Denne et al. ...................... | 455/605 |
| 4,131,791 | 12/1978 | Lego, Jr. ............................ | 455/605 |
| 4,143,263 | 3/1979 | Eichweber ......................... | 455/605 |
| 4,234,969 | 11/1980 | Singh ................................. | 455/607 |
| 4,310,754 | 1/1982 | Check, Jr. ......................... | 455/603 |
| 4,326,298 | 4/1982 | Fromm et al. ..................... | 455/606 |
| 4,436,376 | 3/1984 | Fergason ........................... | 455/605 |

FOREIGN PATENT DOCUMENTS 1072466  9/1954  France .................................. 455/605

Primary Examiner—Joseph A. Orsino
Assistant Examiner—L. Van Beek
Attorney, Agent, or Firm—Wilbert Hawk, Jr.; Albert L. Sessler, Jr.; Elmer Wargo

[57] ABSTRACT

A system and method are disclosed for optically communicating data between two data handling units where one of the data units supplies all of the optical power needed for the optical communications between the two data units. In a preferred embodiment a first data unit comprises a first data source, first and second optical sources of optical energy, and a first optical detector, while a second data unit comprises a second data source, a second optical detector and an optical modulator. In a first mode of operation, a first stream of digital data from the first data source pulse modulates the first optical source on and off causing the first optical source to transmit optical pulses to the second optical detector. These optical pulses are converted by the second optical detector back into a representation of the first stream of digital data for use by the second data unit. In a second mode of operation unmodulated optical energy is transmitted from the second optical source in the first data unit to the optical modulator in the second data unit. A second stream of digital data from the second data source is applied to the optical modulator to accordingly modulate the received unmodulated optical energy. Modulated optical pulses from the optical modulator are therefore reflected to the first optical detector. These reflected modulated optical pulses are converted by the first optical detector back into a representation of the second stream of digital data for use by the first data unit.

4 Claims, 4 Drawing Sheets

BIDIRECTIONAL OPTICAL DATA COMMUNICATIONS SYSTEM

CROSS-REFERENCES TO RELATED APPLICATIONS

This is a continuation of the parent application, Ser. No. 618,001, now abandoned filed July 6, 1984, with this application and the parent application being assigned to the same assignee.

BACKGROUND OF THE INVENTION

1. Field of the Invention

The present invention relates to data communications and particularly to a system and method for establishing bidirectional optical communications between associated data units.

2. Description of the Prior Art

Many different separate systems, subsystems or units have been developed in the electronics field for processing and handling data. Such separate units frequently must be temporarily connected or coupled to other data processing systems or units for exchanging data therebetween. This is particularly true when one unit is portable and the other unit is fixed in position.

Typically, such units are temporarily coupled together by means of electrical connections. Electrical connections between separable units can be accomplished in a number of ways. One conventional way is to have conductive spring fingers on one unit pressing against conductive strips along the edge of the other unit. Another way is to have electrical contacts on one unit moved against the other unit to mate with conductive strips on the other unit when it is in place. Other ways are by means of capacitive or inductive coupling between closely positioned conductors of the two units or by the reception by one unit of radio frequency emissions from the other unit.

The above-described different types of electrical connections for temporarily coupling two units together can suffer from one or more of the following problems:

(1) intermittent contact due to wear or contamination,
(2) contact corrosion,
(3) physical damage,
(4) improper or incomplete physical coupling between the two units, and
(5) excess power required in one of the units.

By optically, rather than electrically, coupling the two units together the problems associated with wear and poor electrical contact are eliminated. Also, the position of one unit with respect to the other unit is far less critical with optical coupling than with electrical coupling. In addition, there is no wear or damage with repeated use.

Optical coupling is particularly advantageous for the transfer of data between the two units when the units are frequently connected and disconnected, when good alignment between units or careful physical insertion or connection cannot be guaranteed, when vibration or mechanical stress would destroy contacts, when environmental conditions would erode conventional contacts and when minimizing the power consumption of one unit for optical communication is critical.

Other practical uses for optical coupling exist where communication is needed between two units sitting side-by-side or even between two circuit boards in adjacent sockets, and also where the units are physically separated by a relatively long distance.

The background art known to the applicants at the time of the filing of this application is as follows:

U.S. Pat. No. 3,377,616, Vehicle Identification System, by J. H. Auer, Jr.;
U.S. Pat. No. 3,630,015, Light Transformation Device, by K. Lehovec;
U.S. Pat. No. 3,705,986, Optical Data Transmission System, by R. W. Sanders et al;
U.S. Pat. No. 4,063,083, Data Communication Systems Using Light Coupled Interfaces; by W. T. Cathey et al;
U.S. Pat. No. 4,234,969, Bidirectional Optical Coupler For A Data Processing System, by A. J. Singh; and
U.S. Pat. No. 4,310,754, Communication Means With Transducer Physically Spaced From Interior Wall of Secure Housing, by F. T. Check, Jr.

SUMMARY OF THE INVENTION

In accordance with one aspect of the invention, there is provided an optical data communications system comprising, in combination, a first data unit including a first source of radiant energy, a first data source for causing said first source to transmit modulated first radiant energy in accordance with a first stream of data therefrom during a first mode of operation, a second source of radiant energy for emitting unmodulated second radiant energy, and a first optical detector responsive to the reception of modulated third radiant energy during a second mode of operation for detecting a second stream of data; and a second data unit including a second optical detector responsive to the reception of said modulated first radiant energy during said first mode of operation for detecting said first stream of data, a second data source for producing a second data stream during said second mode of operation, and liquid crystal means coupled to said second data source and being responsive to said second data stream therefrom for modulating the unmodulated second radiant energy from said first data unit in accordance with said second data stream to develop and transmit said modulated third radiant energy to said first optical detector during said second mode of operation.

It is, therefore, an object of this invention to provide an improved system and method for optically coupling data between two data handling units.

Another object of this invention is to provide an improved system and method for transferring data between two spaced-apart data handling units.

Another object of this invention is to provide an improved system and method for optically communicating data between two data handling units where the power consumption for communication is critical in one of the units.

Another object of this invention is to provide an improved system and method for optically communicating data between two data handling units where one of the units supplies the optical power for the optical communications between the two units.

Another object of this invention is to provide an improved system and method for optically communicating data between two data handling units by means of two sources of radiant energy in one of those units.

Another object of this invention is to provide an improved full duplex optical communications system.

A further object of this invention is to provide an improved half duplex optical communications system.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENT

Figure 1:
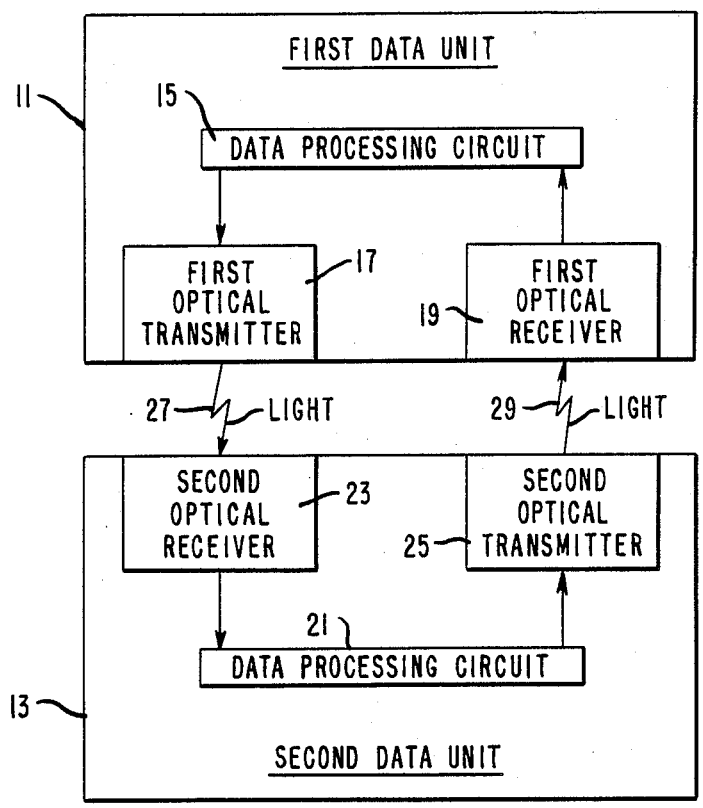
FIG. 1 is a schematic block diagram of an optical communications system in which two data units are optically coupled together for data communications therebetween.

Referring now to the drawings, FIG. 1 discloses an optical data communications system in which two data handling units or data units 11 and 13 are optically coupled together for data communications therebetween.

Data unit 11 comprises a data processing circuit 15, a first optical transmitter 17 and a first optical receiver 19. Similarly, data unit 13 comprises a data processing circuit 21, a second optical receiver 23 and a second optical transmitter 25. Each of the data processing circuits 15 and 21 may include, for example, associated memory, microprocessor, keyboard and display units (not shown).

The data units 11 and 13 can both be portable or fixed in position or one unit can be portable while the other is fixed in position. When, for example, data unit 11 is portable and data unit 13 is fixed in position, data unit 13 may further include, for example a printer (not shown) for printing data out and a modem (not shown) for enabling received data to be applied over a telephone line (not shown) to a remote location.

The first data unit 11, when positioned in close proximity to the second data unit 13 (e.g., perhaps as close as a fraction of an inch from data unit 13), optically communicates with the second data unit in both transmitting and receiving modes of operation, as indicated by the radiant energy or light symbols 27 and 29. This type of optical communications between the first and second data units 11 and 13 can provide reliable communications between the units over a relatively long period of time, as long as there is no critical power consumption restriction on either of the units. However, a problem arises when one of the units 11 and 13 is a portable compact unit which, therefore, operates only from a low power source, such as one or more low power internal batteries. Such critical parameters as portability, compactness and low power operation for one of the units 11 and 13 will severely limit the full duplex, optical communications operation of the portable unit. The optical data communications system of FIG. 2 overcomes such limitations.

Figure 2:
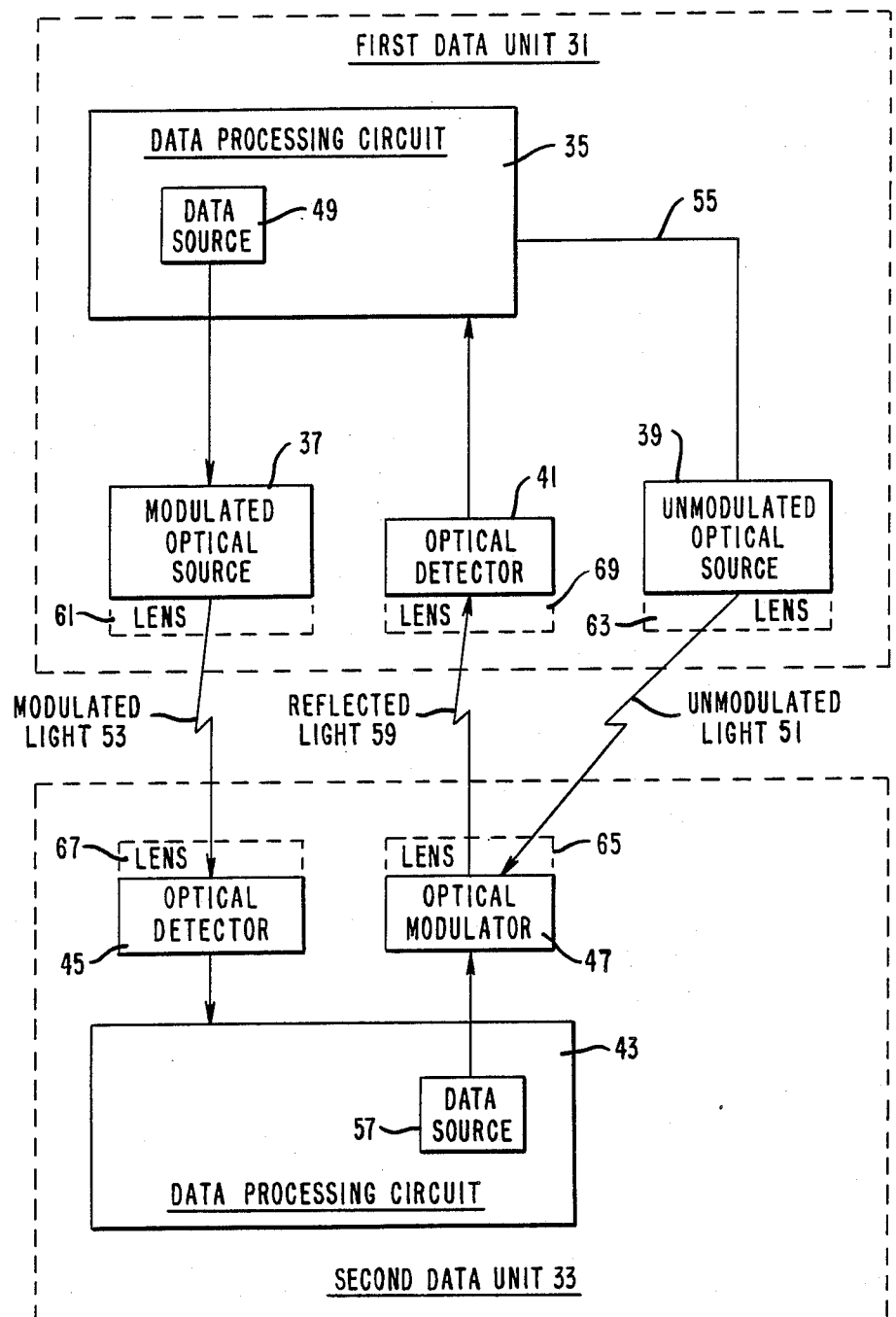
FIG. 2 is a schematic block diagram of an optical data communications system in accordance with a preferred embodiment of the invention.

FIG. 2 discloses an optical data communications system in accordance with a preferred embodiment of the invention. The system of FIG. 2 includes a first data unit 31 which is fixed in position and a second data unit 33 which is a low power or portable compact unit operating from a low power source (not shown), such as one or more low power internal batteries. Because of this low power restriction, the power consumption of the second data unit 33 must be minimized to enable the low power, second data unit 33 to provide reliable optical communications with the first data unit 31 during many uses over a substantially long period of time.

To minimize the power requirements of the second data unit 33, the first data unit 31 is designed to provide all of the optical power to enable each of the units 31 and 33 to optically communicate with the other unit in a full duplex mode of optical communications. To accomplish this objective, the first data unit 31 is implemented to include a data processing circuit 35, a modulated optical source 37, an unmodulated optical source 39 and an optical detector 41, while the second data unit 33 only includes a data processing circuit 43, an optical detector 45 and an optical modulator 47.

Data processing circuits 35 and 43 may be similar in structure and operation to the data processing circuits 15 and 21 of FIG. 1. However, a detailed description of the data processing circuits 35 and 43 is unnecessary for an understanding of the present invention.

The optical sources 37 and 39 operate as optical transmitters, while the optical detectors 41 and 45 operate as optical receivers. Optical sources and optical detectors are well known in the art. An optical source can be, for example, a light emitting diode (LED) or a gas or solid state laser. When a suitable continuous DC voltage from a power supply (not shown) is applied to the optical source 39, the optical source 39 emits a continuous unmodulated radiant energy (optical signal or light) 51. On the other hand, when the optical source 37 is pulsed or modulated on and off by a serial stream of digital data from a first data source 49, the optical source 37 transmits radiant energy pulses (optical pulses or modulated pulses) 53 representative of the modulating data from data source 49. Each of the optical detectors 41 and 45 can be, for example, any suitable type of photodetector for receiving and converting a stream of radiant energy pulses into a stream of electrical digital data pulses usable by the associated one of the data units 31 and 33.

The optical modulator 47 can simply be a liquid crystal cell or element or even a liquid crystal array. The use of a liquid crystal material to modulate a monochromatic beam of light from, for example, a gas or solid state laser, a light emitting diode or other suitable optical source is well known in the art and is taught in U.S. Pat. No. 3,726,584. Essentially, a liquid crystal material can be operated to modulate a monochromatic beam of light directed thereon by changing the voltage across the liquid crystal material in accordance with a stream of data. Such voltage changes across the liquid crystal cell cause changes in the characteristics of the liquid crystal cell which, in turn, change the polarization of light so that the liquid crystal material is switched between reflective and non-reflective (absorptive) states.

In order to have optical communications between the units 31 and 33, the portable unit 33 is positioned in close proximity to and in spaced face-to-face relation with the fixed position unit 31 so that the optical detector 45 is oppositely disposed from the modulated optical source 37 and the optical modulator 47 is substantially oppositely disposed from each of the unmodulated optical source 39 and optical detector 41.

The operation of the units 31 and 33 in utilizing optical communications to input data to or to extract data from the second data unit 33 will now be discussed.

TRANSMITTING DATA FROM UNIT 31 TO UNIT 33

To transmit data from the fixed first data unit 31 to the portable second data unit 33, a serial stream of digital data from a data source 49 in the data processing circuit 35 is applied to the modulated optical source or LED 37. As a result, the optical source 37 is pulsed or modulated on and off, causing the optical source 37 to transmit radiated energy pulses or modulated light 53 to the optical detector 45 in accordance with the stream of data from data source 49. The optical detector 45, which is in close proximity to the transmitting optical source 37, provides a corresponding electrical pulse to the data processing circuit 43 for each modulated light pulse 53 from the optical source 37. The electrical pulses from the optical detector 45 are shaped into digital signals and re-synchronized with a local clock (not shown) by circuitry (not shown) in the data processing circuit 43 to recover the stream of digital data that was initially generated by the data source 49. Such pulse shaping and re-synchronization (timing recovery) techniques are well known in the art and form no part of the present invention.

TRANSMITTING DATA FROM UNIT 33 TO UNIT 31

The transmission of data from the portable low power second data unit 33 requires a different approach. To help the unit 33 conserve its limited power, the unit 31 furnishes the optical power to enable the unit 33 to transmit data to the unit 31. To accomplish this objective, a suitable voltage is applied from a power supply (not shown) in the data processing circuit 35 over a line 55 to the optical source 39 to enable the optical source 39 to emit continuous unmodulated radiant energy or light 51. It should be understood that the data processing circuit 35 could readily remove the voltage on the line 55 by means of a switch (not shown) if no reception of data from the unit 33 is needed or desired.

The unmodulated light 51 from the optical source 39 in data unit 31 illuminates a surface of the optical modulator 47. To modulate this unmodulated light 51 incident on the optical modulator 47, a serial stream of digital data from a data source 57 is applied to the optical modulator 47 to change the reflectivity of the optical modulator 47 in accordance with the stream of digital data. The modulator 47 will reflect the incident unmodulated light 51 at one level of applied voltage (e.g., 0 volts) and absorb the incident unmodulated light 51 at another level of applied voltage (e.g., 5 volts). As a result, radiant energy or unmodulated light 51 from the optical source 39 is modulated by the optical modulator 47 in accordance with the stream of data from data source 49.

Modulated pulses of reflected light 59 from the optical modulator 47 in data unit 33 pass to the optical detector 41 in data unit 31. The optical detector 41 which is in close proximity to the optical modulator 47 provides a corresponding electrical pulse to the data processing circuit 35 for each modulated reflected light pulse 59 from the optical modulator 47. The electrical pulses from the optical detector 41 are shaped into digital signals and re-synchronized with a local clock (not shown) by circuitry (not shown) in the data processing circuit 35 to recover the stream of digital data that was initially generated by the data source 57. As indicated previously, such pulse shaping and re-synchronization (timing recovery) techniques are well known in the art and form no part of the present invention.

The optical data communications system of FIG. 2 may further include optical systems or lenses 61, 63, 65, 67 and 69 to collimate transmitted radiant energy or light or to focus the received radiant energy or light. More specifically, lenses 61 and 63 can be respectively aligned with the emitting areas of the optical sources 37 and 39 in data unit 31 to collimate the respective radiant energy or light signals 53 and 51. Similarly, lens 65 can be aligned with the optical modulator 47 of the data unit 33 to collimate the reflected modulated light 59. Finally, lenses 67 and 69 can be respectively aligned with the optical detector 45 in data unit 33 and the optical detector 41 in data unit 31 to respectively focus the modulated light 53 onto the optical detector 45 of data unit 33 and the reflected modulated light 59 onto the optical detector 41 of data unit 31.

Figure 3:
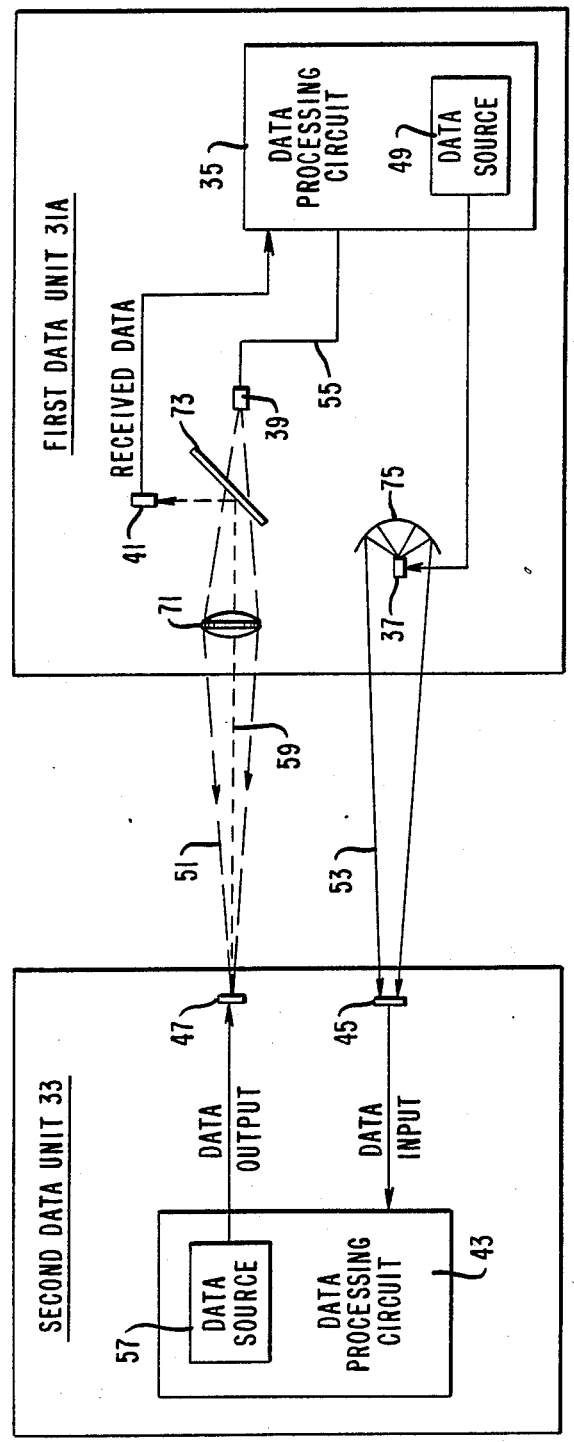
FIG. 3 is a schematic block diagram of a second embodiment of the invention wherein two remotely positioned, optically coupled, data handling units communicate with each other in a full duplex mode of operation.

FIG. 3 discloses an optical data communications system in accordance with a second embodiment of the invention. In the first embodiment shown in FIG. 2, it was stated that the distance between the data units 31 and 33 could be very short —perhaps merely a fraction of an inch. Such a short distance between data units is not a requirement for the optical data communications system of the invention. Therefore, the second embodiment shown in FIG. 3 approaches the other extreme, namely a relatively long communications distance between first data unit 31A and second data unit 33 of FIG. 3 that is only limited by the radiated power or energy of the associated optical sources (to be explained) employed in the embodiment of FIG. 3.

The first data unit 31A of FIG. 3 is essentially a modified version of the first data unit 31 of FIG. 2, while the second data unit 33 of FIG. 3 is the same as the second data unit 33 of FIG. 2. As a consequence of the relatively wide physical separation of the units 31A and 33, the unit 31A includes a telescope or lens system 71 (to view the surface of the optical modulator 47 in the data unit 33), a beam splitter 73 and a parabolic mirror 75, as well as the elements 35, 37, 39 and 41 of the first data unit 31 of FIG. 2.

To transmit data from data unit 31A to data unit 33, modulated radiant energy or light 53 transmitted from the modulated optical source 37 in data unit 31A is directed by the parabolic mirror 75 toward the optical detector 45 in the data unit 33 for detection and utilization of the received digital data by the data unit 33, as discussed before.

In an alternate arrangement, the parabolic mirror 75 could be replaced by an optical system, such as the lens 61 of FIG. 2, aligned with the emitting area of the optical source 37 to focus or direct the radiant energy 53 onto the surface of the optical detector 45.

In the transmission of data from the data unit 33 to data unit 31A the data unit 31A furnishes the optical power for such transmission, as discussed before. More specifically, a suitable voltage is applied from a power supply (not shown) in the data processing circuit 35 over the line 55 to the optical source 39 to enable the optical source 39 to emit continuous unmodulated radiant energy or light. As stated before, it should be understood that the data processing circuit 35 could readily remove the voltage on the line 55 by means of a switch (not shown) if no reception of data from the second data unit 33 is needed or desired.

The unmodulated radiant energy or light 51 from the unmodulated optical source 39 is partially transmitted through the beam splitter 73 and lens system 71 to the optical modulator 47. (The remaining part of unmodulated radiant energy from source 39 is either absorbed by or reflected from the beam splitter 73 and is of no consequence to the transmission of the unmodulated radiant energy 51 to the second data unit 33.) The unmodulated incident light 51 striking the surface of the optical modulator 47 is modulated by the optical modulator 47 in accordance with a stream of data from the data source 57, as discussed before. The resultant modulated pulses of reflected light 59 from the optical modulator 47 pass through the lens system 71 to the beam splitter 73. Part of this reflected modulated light 59 is reflected by the beam splitter 73 to the optical detector 41 for detection by the detector 41 and subsequent processing and utilization of the received digital data by the data processing circuit 35, as discussed before in relation to FIG. 2. The remaining part of the reflected modulated light 59 passes through the beam splitter 73 and is of no consequence to the data detected by the optical detector 41.

Figure 4:
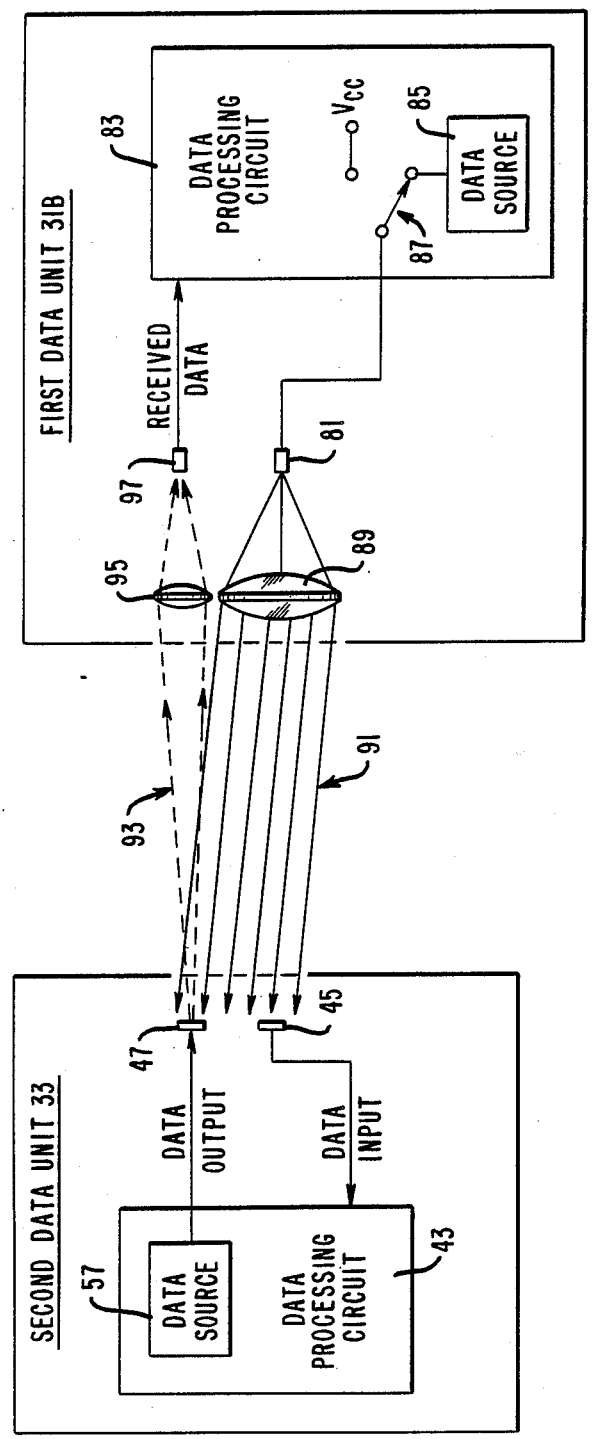
FIG. 4 is a schematic block diagram of a third embodiment of the invention wherein two remotely positioned, optically coupled, data handling units communicate with each other in a half duplex mode of operation.

FIG. 4 discloses an optical data communications system in accordance with a third embodiment of the invention. The embodiment of FIG. 4 includes a fixed first data unit 31B and a low power second data unit 33 which is the same as the second data unit 33 of FIGS. 2 and 3. The data units 31B and 33 are separated from each other by a relatively long distance, similar to that of the data units 31A and 33 of FIG. 3. However, while the embodiment of FIG. 3, as well as the embodiment of FIG. 2, can be operated in full duplex modes of operation (i.e., simultaneous transmission and reception by either or both of the data units 31A and 33 of FIG. 3 or by either or both of the data units 31 and 33 of FIG. 2), the embodiment of FIG. 4 can only be operated in a half duplex mode of operation (i.e., only one of the two optically coupled data units 31B and 33 can transmit at any given time).

As shown in FIG. 4, there is only one optical source 81 located in the first data unit 31B. This optical source 81 may be, for example, a gas laser or a laser diode. A data processing circuit 83, which includes a data source 85 and a switching means or electronic switch 87, determines whether the system of FIG. 4 is in a transmit or a receive mode of operation.

In a transmit mode of operation, the data processing circuit 83 internally positions the switch 87 to pass a stream of digital data from the data source 85 to the optical source 81. This stream of data modulates the optical source 81 on and off, causing the optical source 81 to transmit modulated radiant energy or light. An optical system or lens system 89 is aligned with the emitting area of the optical source 81 to collimate the modulated light into a light beam 91 which is directed to front surfaces of both the optical detector 45 and the optical modulator 47 in the second data unit 33.

The optical detector 45 converts the received modulated radiant energy into an electrical data input which is utilized by the data processing circuit 43 in the data unit 33, as discussed before.

As long as the data processing circuit 43 is receiving data transmitted from the first data unit 31B, it keeps the data source 57 disabled by, for example., internally applying a disabling signal (not shown) thereto. When disabled, the data source 57 outputs a suitable signal on a data output line to cause the optical modulator 47 to absorb or not reflect that portion of the modulated light beam 91 that is striking its front surface.

When the data source 85 in the data processing circuit 83 of the first data unit 31B has completed its transmission of data, the data processing circuit 83 internally switches the position of the electronic switch 87 by means (not shown), such as a signal. The switching of the electronic switch 87 causes the system of FIG. 4 to go into the receive mode of operation. In the receive mode of operation a suitable DC voltage Vcc is applied via the switch 87 to the optical source 81. The voltage Vcc enables the optical source 81 to emit continuous unmodulated radiant energy or light, which is collimated into the light beam 91. As stated before, the light beam 91 is directed to front surfaces of both the optical detector 45 and the optical modulator 47 in the second data unit 33.

Since the light beam 91 is not modulated at this time, the optical detector 45 does not develop any data input to the data processing circuit 43. Since the data processing circuit 43 is not receiving data from the first data unit 31B, the circuit 43 enables the data source 57 by, for example, removing the disabling signal (not shown) to the data source 57. If the second data unit 33 has data to transmit, the enabled data source 57 starts outputting a stream of digital data to the optical modulator 47. As a result, the optical modulator 47 modulates or reflects the unmodulated radiant energy or light 91 from the data unit 31B in accordance with the stream of data from data source 57, as discussed before.

The resultant modulated pulses of reflected light 93 from the optical modulator 47 in data unit 33 pass through an optical system or lens system 95 to an optical detector 97 similar to the optical detector 41 of FIGS. 2 and 3. The optical detector 97 detects the data transmitted from the data unit 33 and applies this detected received data to the data processing circuit 83 for subsequent processing and utilization similar to that discussed before for the data processing circuit 35 of FIG. 2.

It should be noted at this time that the communications distance between the data units 31A and 33 of FIG. 3, or between the data units 31B and 33 of FIG. 4, is only limited by the radiated power or energy of the associated optical source or sources employed in the system. Laser light sources assist in directing radiant or light energy to the proper location and, as the cost of solid state lasers becomes lower, should become a more common means of providing the modulated light for data input as well as the optical source of illumination for an optical modulator (or liquid crystal cell or array) for data output.

The invention thus provides a system and method for establishing bidirectional optical communications between associated data units where one of the data units supplies all of the optical power needed for each data unit to transmit optical data to the other data unit.

While the salient features have been illustrated and described in several embodiments of the invention, it should be readily apparent to those skilled in the art that many changes and modifications can be made in those embodiments of the invention without departing from the spirit and true scope of the invention. For example, although the form of modulation implied by the description of the invention is amplitude (or off-on) modulation, the term "modulation" (as used in the description) is intended to also include the possible modulation of other characteristics of the optical energy or light, such as the modulation of the phase or polarization angle or the modulation of the frequency or wavelength of the optical energy or light. Accordingly, the present invention should be considered as encompassing all such changes and modifications of the invention that fall within the broad scope of the invention as defined by the appended claims.

What is claimed is:

1. A data communications system which operates in first and second modes of operation; said data communications system comprising:
   first and second data units; and
   a coupling means for coupling said first and second data units less than an inch apart;
   said first data unit being a host terminal comprising:
   a first data means for handling data;
   first and second light sources;
   a first modulating means for modulating said first light source in accordance with a first stream of data supplied by said first data means to generate a first beam of modulated light when said system is operated in said first mode of operation; and
   a first optical detector for detecting a second beam of modulated light and also for generating a second stream of data by demodulating said second beam of modulated light when said system is operated in said second mode of operation; said second stream of data being passed on to said first data means from said first optical detector;
   said second data unit being a portable terminal positioned in face to face relation with said host terminal comprising:
   a second data means for handling data;
   a second modulating means including a liquid crystal device for modulating the light of said second light source in accordance with a third stream of data supplied by said second data means to generate said second beam of modulated light to be detected by said first optical detector when said system is operated in said second mode of operation; and
   a second optical detector for detecting said first beam of modulated light and also for generating a fourth stream of data by demodulating said first beam of modulated light when said system is operated in said first mode of operation; said fourth stream of data being passed on to said second data means from said second optical detector; and
   said coupling means having means for positioning said first light source and said first modulating means in face to face opposed relation with said second optical detector, said second light source in substantially face to face opposed relation with said second modulating means, and said second modulating means being in opposed relation with said first optical detector.

2. The data communications system as claimed in claim 1 wherein said first and second optical detectors are photodetectors.

3. The data communications system as claimed in claim 2 wherein said first and second light sources are light emitting diodes.

4. The data communications system as claimed in claim 3 wherein said first and second optical detectors include, respectively, first and second optical system means for focusing and collimating light and also for shielding said photodetectors from extraneous light.

* * * * *